United States Patent [19]

Hayashi et al.

[11] Patent Number: 5,166,290
[45] Date of Patent: Nov. 24, 1992

[54] RESIN COMPOSITION FOR COMPOSITE MATERIAL

[75] Inventors: Shigetsugu Hayashi; Hisashi Tada; Takashi Murata, all of Nagoya, Japan

[73] Assignee: Mitsubishi Rayon Co., Ltd., Tokyo, Japan

[21] Appl. No.: 867,432

[22] Filed: Apr. 13, 1992

Related U.S. Application Data

[62] Division of Ser. No. 381,392, Jul. 18, 1989.

[30] Foreign Application Priority Data

Nov. 30, 1987 [JP] Japan ............................... 62-302084
Dec. 15, 1987 [JP] Japan ............................... 62-316750

[51] Int. Cl.$^5$ .................. C08F 222/40; C08F 216/12; C08G 8/10; C08L 61/10
[52] U.S. Cl. .................. 525/502; 524/541; 526/262; 526/307.5; 526/313
[58] Field of Search .................. 525/502; 524/541; 526/262, 307.5, 313

[56] References Cited

U.S. PATENT DOCUMENTS

| | | | |
|---|---|---|---|
| 4,100,140 | 7/1978 | Zahir et al. | 526/89 |
| 4,608,426 | 8/1986 | Stern | 528/170 |
| 4,632,966 | 12/1986 | Kanagawa et al. | 525/502 |
| 4,755,569 | 7/1988 | Kanagawa et al. | 525/502 |
| 4,812,511 | 3/1989 | Domeier | 526/259 |
| 4,853,449 | 8/1989 | Domeier | 526/259 |

FOREIGN PATENT DOCUMENTS

| | | |
|---|---|---|
| 52-000994 | 1/1977 | Japan . |
| 55-092714 | 7/1980 | Japan . |
| 62-022812 | 1/1987 | Japan . |
| 63-023913 | 2/1988 | Japan . |
| 61095012 | 2/1988 | Japan . |

Primary Examiner—James J. Seidleck
Assistant Examiner—Vasu S. Jagannathan
Attorney, Agent, or Firm—Oblon, Spivak, McClelland, Maier & Neustadt

[57] ABSTRACT

A resin composition for composites which comprises as essential components (A) a three-bismaleimide mixture of N,N'-diphenylmethanebismaleimide, N,N'-tolylenebismaleimide, and N,N'-trimethylhexamethylenebismaleimide and (B) an allyl etherified substituted phenol novolak resin and/or allyl phenyl ether compound represented by the following general formula (I):

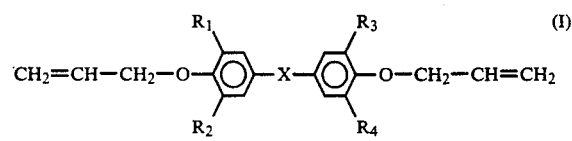

wherein, X denotes a direct bond or the divalent radical

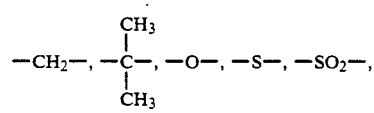

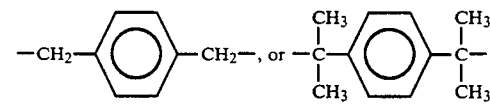

and $R_1$ through $R_4$ are the same or different in a molecule and denote each —$CH_3$, —$C_2H_5$, —$CH(CH_3)_2$, —$nC_3H_7$, —$nC_4H_9$, —$C(CH_3)_3$,

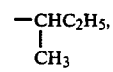

—$CH_2CH(CH_3)_2$, or —Br.

1 Claim, No Drawings

RESIN COMPOSITION FOR COMPOSITE MATERIAL

This is a continuation of application Ser. No. 07/381,392, filed on Jul. 18, 1989 pending.

TECHNICAL FIELD

The present invention relates to resin compositions for composite materials and more particularly to a resin composition for composite materials which has superior processability and provides hardened products superior in heat resistance, water resistance, and mechanical properties.

BACKGROUND ART

Various resin compositions have so far been used as matrix resins for composite materials. Particularly in the field of thermosetting resins, epoxy resins have been used extensively in that these resins themselves are superior in mechanical properties, especially strength and elongation, and additionally good in adhesion to reinforcing materials and highly reinforced therewith.

However, there are restrictions of heat resistance, high-temperature mechanical properties, and water resistance on the use of epoxy-resins. That is, epoxy resins have become unable to satisfy recent year requirements for high-performance composite materials with respect to heat resistance and other properties.

Thermosetting aromatic polyimide resins are known as heat resistant resins. Although excellent in heat resistance, these resins yield by-products in the curing reaction process, hence being inferior in processability. Bismaleimide compounds are also known as heat resistant thermosetting resins, but the products of curing these compounds alone are inferior in mechanical properties (particularly strength and elongation), hence these compounds being deficient in practicability. Such being the case, attempts have been made to addition-polymerize bismaleimides with diamines or the like. Products of curing by these addition process, although excellent in heat resistance, are brittle and since uncured compositions of these polymers have high melting points or glass transition temperatures, special high-boiling solvents are necessary when these compositions are used for impregnation, lamination, casting, adhesion, molding material applications, or the like, that is, there are problems in the processability of those compositions.

Recently, thermosetting resin compositions containing polyimide and alkenylphenol and/or alkenyl phenyl ether have been disclosed (Japanese Patent Application Kokai No. Sho. 52-994) as substitutes for the above mentioned resin composition. While the products of curing these recently disclosed resin compositions are excellent in mechanical properties such as strength and elongation, they have problems such as low thermal-degradation resistance because of their hydroxy groups remain in the cured compositions When allyl phenyl ether compounds which were disclosed in that patent are used, Claisen rearrangement reaction takes place by heating, so hydroxy groups are introduced in the cured compositions. In addition, these resins are deficient in reactivity and hence their processing requires long-time heating at high temperatures.

On the other hand, compositions composed of an allyl etherified substituted phenol novolak resin which is substantially free of hydroxy groups and bismaleimides are proposed (Japanese Patent Application Kokai No. Sho. 62-22812) as substitutes for the above resin compositions.

Although excellent in heat resistance and water resistance, the products of curing these resin compositions are somewhat inferior in mechanical properties such as strength and elongation and since the compatibility of the novolak resin with the bismaleimide is low, mixing of the two components requires long time at elevated temperatures. Moreover the resulting mixture, having high viscosity, possess a processability problem in that when these resin compositions are used as matrix resins for composite materials, the solventless impregnation with these compositions is difficult.

DISCLOSURE OF INVENTION

The present inventors made intensive studies with the object of providing a thermosetting re in composition which is superior in heat resistance and mechanical properties as well as in processability. As a result, it has been found that a resin composition containing a specific allyl compound and bismaleimide compounds is fitted for achieving the above object, and the present invention has been accomplished. BEST MODE FOP CARRYING OUT THE INVENTION The substance of the present invention is a resin composition for composites which comprises as essential components (A) the mixture of N,N'-diphenylmethanebismaleimide, N,N'-tolylenebismaleimide, and N,N'-trimethylhexamethylenebismaleimide and (B) an allyl etherified substituted phenol novolak resin and/or an allyl phenyl ether compound represented by the following general formula (I):

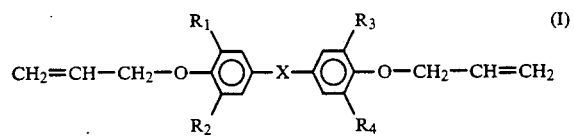

wherein, X denotes a direct bond or the divalent radical

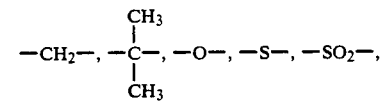

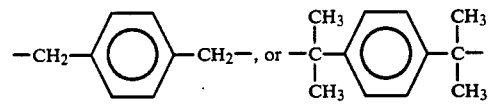

and $R_1$ through $R_4$ are the same or different in a molecule and denote each $-CH_3$, $-C_2H_5$, $-CH(CH_3)_2$, $-nC_3H_7$, $-nC_4H_9$, $-C(CH_3)_3$,

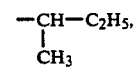

$-CH_2CH(CH_3)_2$, or $-Br$.

N,N'-Diphenylmethanebismaleimide, N,N'-tolylenebismaleimide, and N,N'-trimethylhexamethylenebismaleimide, used in the present invention, can be produced by a known method which comprises reacting separately the corresponding diamino compounds, viz. (i) 4,4'- or 3,3'-diaminodiphenylmethane or a mixture of these two isomers, (ii) 2,4-, 2,6-, or 3,4-diaminotoluene or a mixture of two or all of these isomers, and (iii) 2,2,4- or 2,4,4-trimethylhexamethylenediamine or a mixture of these two isomers, with maleic anhydride. Mixing of those three bismaleimides may be conducted at any of the time of producing them, the time next to the production step, and the time of mixing them with the allyl etherified substituted phenol novolak resin and/or an allyl phenyl ether compound (I).

The mixing proportions of those bismaliemides are chosen so that the resulting mixture may melt at a temperature of 70° to 120° C. That is to say, the proportions of N,N'-diphenylmethanebismaleimide, N,N'-tolylenebismaleimide, and N,N'-trimethylhexamethylenebismaleimide are chosen optionally from the respective ranges of 40 to 80%, 10 to 45%, and 5 to 35%, by weight.

When the mixing proportions of those components depart from the respective ranges defined above, the melting temperature of the mixture exceeds 120° C., being undesirable to handling.

The allyl etherified, substituted phenol novolak resin used in the present invention is a resin substantially free of phenolic hydroxy groups, which is produced by reacting allyl halide such as allyl chloride, allyl bromide or allyl iodide in the presence of alkali with a novolak resin having usually on average 2 to 15 benzene rings. This novolak resin is produced according to a known method by condensation of one or more phenols substituted by alkyl groups, aryl groups, aralkyl groups, or halogen atoms, that is, substituted phenols including, for example, cresol, ethylphenol, isopropylphenol, butylphenol, octylphenol, nonylphenol, vinylphenol, isopropenylphenol, phenylphenol, benzylphenol, chlorophenol, bromophenol, xylenol, and methylbutylphenol (each including isomers), with an aldehyde such as formaldehyde, furfural, or acrolein. In particular, allyl etherified cresol novolak resins can be favorably used.

The allyl phenyl ether compound used in the present invention can be synthesized by a known method which comprises reacting a bisphenol-compound having a substituent such as —CH , —$C_2H_5$, —$C(CH_3)_3$, —Br and so on at each of the 2,6-positions relative to the phenolic hydroxy groups, with an allyl halide such as allyl chloride or allyl bromide in the presence of an alkali metal hydroxide and a solvent. Suitable bisphenol compounds for use in the synthesis include, for example, 4,4'-methylenebis(2,6-dimethylphenol), 4,4'-methylenebis(2-t-butyl-6-methylphenol), 4,4'-(1-methylethylidene) bis(2,6-dimethylphenol), 4,4'-(1-methylethylidene) bis(2,6-dibromophenol), 4,4'-[1,4-phenylenebis (1-methylethylidene)]bis(2,6-dimethylphenol), 4,4'-oxybis(2,6-disubstituted phenol), 4,4'-thiobis-(2,6-disubstituted phenol), and 4,4'-sulfobis(2,6-dimethylphenol). These allyl phenyl ether compounds may be used alone or in combination.

It is a great characteristic of the allyl phenyl ether compound used in the present invention that the phenolic hydroxy group formation due to Claisen rearrangement does not take place because this compound is produced from a bisphenol compound having substituents at the 2,6-positions relative to the phenolic hydroxy groups.

In the present invention there is no particular restriction on the amount ratio of the three-bismaleimide mixture of N,N'-diphenylmethanebismaleimide, N,N'-tolylenebismaleimide, and N,N'-trimethylhexamethylenebismaleimide to the allyl etherified substituted phenol novolak resin and/or the allyl phenyl ether compound of the above structural formula (I),.but the ratio of double bonds contained in the former bismaleimide mixture to double bonds contained in the latter is desired to be from 0.2 to 2. When the ratio exceeds 2, the content of unreacted allyl groups in the products of curing the resin composition increases and hence the heat resistance is undesirably lowered.

The bismaleimide mixture used herein can also be reacted in advance with the allyl etherified substituted phenol novolak resin and/or the allyl phenyl ether compound to such an extent that the gelation may not take place.

Though the resin composition of the present invention can be thermally cured with ease, a catalyst may be added for the purpose of providing cured articles having desired properties or controlling thermosetting characteristics of the resin. Suitable catalysts for these purposes include imidazole compounds, tertiary amines, ionic catalysts such as quaternary ammonium salts and boron fluoride amine salts, and known radical polymerization initiators such as organic peroxides and hydroperoxides and azobisisobutyronitrile.

The amount of catalyst to be added is decided according to the end use of cured articles. In view of the stability of the resin composition, desirable amounts of catalyst are from 0.2 to 3% by weight based on the whole resin content of the composition.

Other known resins, if desirable may be added to the resin composition of the present invention. Those resins include thermosetting resins, e.g. epoxy resins, unsaturated polyester resins, phenolic resins, silicone resins, triazine resins, and allyl resins, and thermoplastic resins, e.g. polyethersulfone, polyester, polyetheretherketone, and polyetherimide.

Casting or molding compounds can be readily prepared from the resin composition of the present invention by blending with various fillers or reinforcing materials using a mixer or a roll kneader at relatively low temperatures.

For impregnating a reinforcing material with the resin composition of the present invention, the resin composition is subjected to preliminary reaction at a temperature of 50° to 150° C. to produce a prepolymer, and the reinforcing materials are impregnated with this prepolymer in melt form. In many cases, this impregnation can be carried out at relatively low temperatures since this prepolymer has sufficiently low viscosity at low temperatures. If desirable, the impregnation may be conducted, of course, with the prepolymer dissolved in a solvent such as methyl ethyl ketone, methylene chloride, chloroform, or tetrahydrofuran.

Suitable materials for use to reinforce the resin composition include inorganic fibers, e.g. glass fiber, carbon fiber, boron fiber, and silicon carbide fiber and organic fibers of poly-p-benzamide and polyamidehydrazide, in the form of chops, yarns, tapes, sheets, knittings, mats or paper-like materials, and further include asbestos, mica, and talc, and mixtures of two or more of all the above materials. For certain applications, it is also possible to use fine silicon oxide powders and the like, such as flow modifiers, pigments, dyes, stabilizers, plasticizers, lubricants, tar, and asphalt, alone or in combination with other reinforcing agents.

The content of reinforcing agent is desired to be from 5 to 80% by volume.

EXAMPLE

The following examples illustrate the present invention in more detail.

In the examples, the viscosity of uncured resin was measured at 50° C. with a dynamic mechanical spectrometer supplied by Rheometrics Co.

The glass transition temperature (Tg) was determined according to the TMA method by using Perkin-Elmer Model TMS-2 with DSC-2.

The hot-water resistance of composite material was judged by allowing a 16-layer, 0° laminated composite to stand in water of 95° C. for 14 days and then measuring the interlaminar shear strength (ILSS) at room temperature, 177° C., and 232° C. in accordance with ASTM D-2344.

The impact resistance was determined according to NASA RP 1092 by fixing a test specimen in plate form (4"×6"×0.25") on a supporting board having a hole (3"×5"), dropping a 4.9 Kg weight having a nose of ½ inch R on the center of the specimen (this center being positioned over the center of the hole) to give a shock of 1000 lb.in per 1-inch thickness of the specimen, and subjecting the specimen to a compression test.

All the data on composites are expressed in terms of the values on composites containing 60% by volume of fiber.

REFERENCE EXAMPLE 1

Synthesis of 4,4'-methylenebis(2,6-dimethylallylphenyl ether)

In a reactor fitted with a thermometer, stirrer, dropping funnel, and reflux condenser, were heated 256 g of 4,4'-methylenebis(2,6-dimethylphenol) (m.p. 174° C.), 82.5 g of NaOH, and 1 l of n-propanol under reflux.

After all the reactants had been dissolved, 200 ml of allyl chloride was added slowly.

Five hours later the mixture was found to be substantially neutral. Further, the mixture was stirred under reflux for 3 hours and then cooled to room temperature. The precipitated NaCl was filtered away, and the n-propanol was removed by evaporation.

330 Gram of the thus obtained crude diallyl ether of 4,4'-methylenebis(2,6-dimethylphenol) was dissolved in methylene chloride, and washed with water.

The aqueous layer was separated, and the methylene chloride was evaporated away, giving 325 g of 4,4'-methylenebis(2,6-dimethyl-allylphenyl ether) (hereinafter abbreviated as ALE-1).

REFERENCE EXAMPLE 2

Synthesis of 4,4'-(1-methylethylidene)bis(2,6-dimethylallylphenyl ether)

Using 248 g of 4,4'-(1-methylidene)bis(2,6-dimethylphenol) (m.p. 166° C.), i.e. the corresponding bisphenol compound, the title product (hereinafter abbreviated as ALE-2) was prepared according to the procedure of Reference Example 1.

REFERENCE EXAMPLE 3

'10 Synthesis of 4,4'-[1,4-phenylenebis(1-methyl ethylidene)]bis(2,6-dimethylallylphenol)

Using 402 g of 4,4'-[1,4-phenylenebis(1methylethylidene)bis(2,6-dimethylphenol) (m.p. 161° C.), i.e. the corresponding bisphenol compound, the title product (hereinafter abbreviated as ALE-3) was prepared according to the procedure of Reference Example 1.

EXAMPLES 1–3

An allyl etherified substituted phenol resin (hereinafter abbreviated as ALM) synthesized by the method described in Reference Example 1 of Japanese Patent Application Kokai No. Sho. 62-2281 and a mixture of 49.4 wt% of N,N'-diphenylmethanebismaleimide, 33.4 wt% of N,N'-tolylenebismaleimide, and 17.2 wt% of N,N'-trimethylhexamethylenebismaleimide were mixed together, in varying equivalent ratios of double bonds in the ALM to those in the bismaleimide mixture as shown in Table 1, with stirring at 130° C. for 30 minutes to react preliminarily, giving prepolymers. Portions of these prepolymers were each interposed between glass plates so that the interposed prepolymer layer might have a predetermined thickness, and the interposed prepolymers were cured at 180° C. for 2 hours and further hardened resin plates of three types. Another portion of each prepolymer was extended at 80° C. to thin film form on release paper, and in this state, applied onto a carbon fiber (supplied by Mitsubishi Rayon Co., Ltd. under the tradename of Pyrofil T-3) wound around a drum, impregating the fiber with this prepolymer. Then the prepolymer-carbon fiber composite sheets were cut open, giving unidirectional prepregs (yarn basis weight 145 g/m², resin content 33 wt%). Portions of each prepreg were laminated together in the form of [0°]₁₆ as well as in the quasi-isotropic form of [+45°/0°/−45°/90°]₄ₛ. These laminates were cured at 180° C. for 2 hours and further post-cured at 220° C. for 4 hours. Various tests were conducted on those uncured resins, cured resins, and composites. Results of the tests are shown in Table 1.

EXAMPLES 4 and 5

Resin plates and composites were formed according to the procedure of Example 1 but using a bismaleimide mixture of 65 wt% of N,N'-diphenylmethane-bismaleimide, 20 wt% of N,N'-tolylenebismaleimide, and 15 wt% of N,N'-trimethylhexamethylenebismaleimide.

Results of the same tests are shown in Table 1.

COMPARATIVE EXAMPLES 1 and 2

Resin plates were formed according to the procedure of Example 1 except that only N,N'-diphenylmethanebismaleimide was used to react with ALM and the mixing temperature was changed to 170° C. Composites were formed by fiber impregnation with in a 50% tetrahydrofuran solution of each prepolymer because the impregnation with each melted prepolymer was infeasible under the same conditions as used in Example 1.

Results of the same tests are shown in Table 1.

COMPARATIVE EXAMPLE 3

A resin plate and a composite were formed according to the procedure of Example 1 but 40 parts by weight of a heat resistant epoxy resin (supplied by Sumitomo Chemical Co., Ltd. under the registered tradename of Sumi-Epoxy ELM-434) was added to 100 parts by weight of the same resin composition as used in Comparative Example 1 and the mixing temperature was 160° C.

Results of the same tests are shown in Table 1.

EXAMPLES 6-11

Resin plates and composites were formed according to the procedure of Example 1 except that ALE-1, ALE-2, and ALE-3 synthesized in Reference Examples 1, 2, and 3, respectively, were used separately and the equivalent ratios of double bonds in the bismaleimide mixtures to those in the Allyl compounds were set as shown in Table 2.

Results of the same tests on the uncured resins, cured resins, and composites are shown in Table 2.

EXAMPLE 12

A resin plate and a composite were formed according to the procedure of Example 1 but by using a 1:1 mixture of ALM and ALE-1. Results of the same tests on the uncured resin, cured resin, and composite are shown in Table 2.

EFFECT OF THE INVENTION (INDUSTRIAL APPLICABILITY)

The resin compositions of the present invention have superior processability and provide cured articles and composites superior in heat resistance, impact resistance, and mechanical properties, being useful as materials for casting, impregnation, and lamination, particularly as heat resistant materials for aeronautic and space applications.

What is claimed is:

1. A resin composition for composites, which comprises the following two components (A) and (B) as essential components:
   (A) a mixture of N,N'-diphenylmethanebismaleimide, N,N'-tolylenebismaleimide, and N,N'-trimethylhexamethylenebismaleimide; and
   (B) an allylphenyl ether compound of the formula:

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Double bonds in ALM/Double bonds in single bismaleimide or in mixture of three bismaleimides | 1.5/1 | 1/1 | 1/1.5 | 1/1 | 1/1.5 | 1.5/1 | 1/1.5 | 1.5/1 (epoxy resin was added) |
| Viscosity (poise) of uncured resin at 50° C. | $2.015 \times 10^3$ | $3.523 \times 10^3$ | $5.211 \times 10^3$ | $4.341 \times 10^3$ | $7.821 \times 10^3$ | $3.201 \times 10^4$ | $5.213 \times 10^5$ | $7.821 \times 10^3$ |
| Tg (°C.) of resin plate | 300 | 310 | 315 | 312 | 314 | 300 | 312 | 270 |
| Flexural strength (Kg/mm$^2$) | 13.4 | 13.6 | 13.6 | 13.4 | 14.2 | 13.2 | 13.4 | 13.3 |
| Flexural elastic modulus (Kg/mm$^2$) | 345.0 | 360.0 | 370.0 | 364.2 | 375.2 | 345.2 | 362.1 | 352.0 |
| Elongation (%) | 3.9 | 4.1 | 4.0 | 4.2 | 4.2 | 3.8 | 4.0 | 3.8 |
| Composite ILSS (Kg/mm$^2$) | | | | | | | | |
| at room temperature | 10.2 | 11.5 | 11.6 | 11.4 | 12.0 | 10.2 | 11.2 | 12.8 |
| at 177° C. | 7.5 | 7.6 | 7.8 | 8.2 | 7.9 | 7.4 | 7.8 | 7.5 |
| at 232° C. | 6.8 | 7.2 | 7.3 | 6.9 | 7.2 | 6.9 | 6.4 | 3.4 |
| at room temperature (wet) | 9.3 | 9.3 | 9.4 | 9.4 | 9.5 | 9.3 | 9.5 | 8.0 |
| at 177° C. (wet) | 5.2 | 5.1 | 5.2 | 6.3 | 6.4 | 4.9 | 6.0 | 4.2 |
| at 232° C. (wet) | 4.2 | 4.4 | 4.5 | 4.1 | 4.2 | 4.0 | 4.3 | 2.3 |
| Compression strength after impact (Kg/mm$^2$) | 18.4 | 19.5 | 19.6 | 18.1 | 19.2 | 17.4 | 17.6 | 15.3 |

TABLE 2

| | | Example No | | | | | | |
|---|---|---|---|---|---|---|---|---|
| | | 6 | 7 | 8 | 9 | 10 | 11 | 12 |
| Allyl compound | | ALE-1 | ALE-1 | ALE-1 | ALE-2 | ALE-2 | ALE-3 | ALM/ALE-1 = 1/1 |
| Double bonds in allyl compound/Double bonds in bismaleimide compound | | 1/1 | 1/1.5 | 1/2.0 | 1/1 | 1/1.5 | 1/1 | 1/1 |
| Viscosity (Poise) of uncured resin at 50° C. | | $1.55 \times 10^3$ | $2.42 \times 10^3$ | $4.06 \times 10^3$ | $1.69 \times 10^3$ | $1.88 \times 10^3$ | $1.82 \times 10^3$ | $2.25 \times 10^3$ |
| Properties of resin plate | Tg (by TMA method) | 278 | 282 | 288 | 280 | 290 | 293 | 300 |
| | Flexural strength (Kg/mm$^2$) | 20.5 | 19.5 | 18.0 | 19.7 | 19.2 | 21.4 | 18.2 |
| | Flexural elastic modulus (Kg/mm$^2$) | 370 | 373 | 378 | 367 | 383 | 372 | 365 |
| | Elongation (%) | 6.0 | 5.5 | 5.0 | 5.8 | 5.3 | 5.8 | 5.4 |
| Properties of composite | ILSS (Kg/mm$^2$) | | | | | | | |
| | at room temperature | 12.3 | 12.0 | 11.8 | 12.1 | 11.7 | 12.2 | 12.0 |
| | at 177° C. | 9.0 | 8.8 | 8.7 | 9.1 | 8.5 | 8.8 | 8.5 |
| | at 232° C. | 7.4 | 7.3 | 7.3 | 7.2 | 6.8 | 7.0 | 7.4 |
| | at room temperature (wet) | 11.2 | 11.0 | 11.1 | 10.9 | 10.8 | 11.1 | 10.5 |
| | at 177° C. (wet) | 6.2 | 6.1 | 5.9 | 6.0 | 5.7 | 6.1 | 5.8 |
| | at 232° C. (wet) | 4.5 | 4.5 | 4.3 | 4.1 | 3.9 | 4.0 | 4.5 |
| | Compression strength after impact (Kg/mm$^2$) | 19.9 | 19.7 | 18.7 | 19.4 | 18.9 | 19.6 | 19.8 |

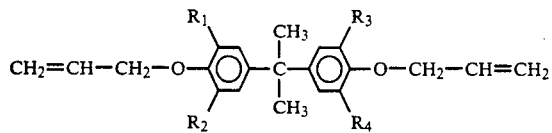
wherein $R_1$ through $R_4$ are the same or different in a molecule and each is —$CH_3$, —$C_2H_5$, —$CH(CH_3)_2$, —$nC_3H_7$, —$nC_4H_9$, —$C(CH_3)_3$
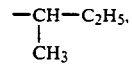
—$CH_2CH(CH_3)_2$, or —Br.
* * * * *

UNITED STATES PATENT AND TRADEMARK OFFICE
CERTIFICATE OF CORRECTION

PATENT NO. : 5,166,290

DATED : November 24, 1992

INVENTOR(S) : Shigetsugu Hayashi et al.

It is certified that error appears in the above-identified patent and that said Letters Patent is hereby corrected as shown below:

On the title page, Item [30],

The PCT Information has been omitted from the Foreign Application Priority Data, should read:

--Nov. 30, 1987 [JP]  Japan................62-302084--

Dec. 15, 1987 [JP]  Japan................62-316750

Nov. 29, 1988 [PCT]  PCT.................PCT/JP88/01204--

Signed and Sealed this

Seventh Day of December, 1993

Attest:

BRUCE LEHMAN

Attesting Officer     Commissioner of Patents and Trademarks